United States Patent [19]

Lemke

[11] 4,322,763
[45] Mar. 30, 1982

[54] MAGNETIC HEAD HAVING A CONTROLLABLE HIGH-PERMEABILITY TUNNEL WITHIN A LOW-PERMEABILITY SLEEVE

[75] Inventor: James U. Lemke, Del Mar, Calif.

[73] Assignee: Spin Physics, Inc., San Diego, Calif.

[21] Appl. No.: 127,278

[22] Filed: Mar. 5, 1980

[51] Int. Cl.³ .............................. G11B 5/22; G11B 5/28
[52] U.S. Cl. ..................................... 360/115; 360/120; 360/121
[58] Field of Search .............. 360/119, 121, 125, 126, 360/127, 115, 120

[56] References Cited
U.S. PATENT DOCUMENTS 3,555,204  1/1971  Braun ................................ 360/115
3,845,503  10/1974  Kanai ................................ 360/115

*Primary Examiner*—Robert S. Tupper
*Attorney, Agent, or Firm*—Robert F. Cody

[57] ABSTRACT

A magnetic record and/or reproduce head, comprised of electrically conductive magnetic core material, has an electrically conductive transducer gap having a magnetic gap length of less than about 15 microinches. The head is selectively actuable by passing a current through the core material via the gap.

11 Claims, 6 Drawing Figures

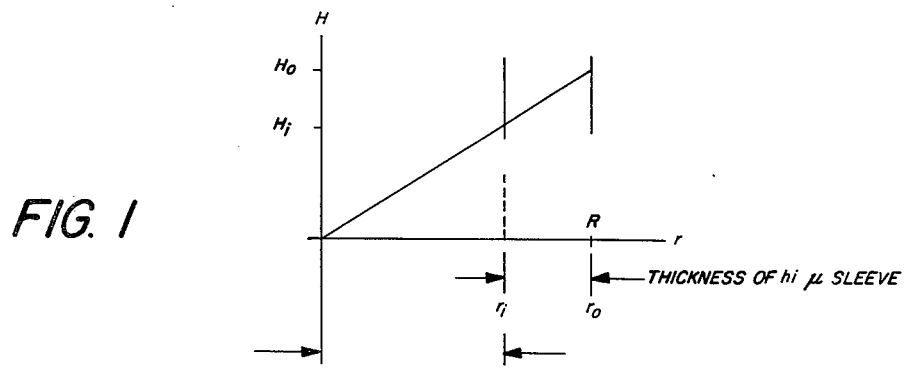
FIG. 1
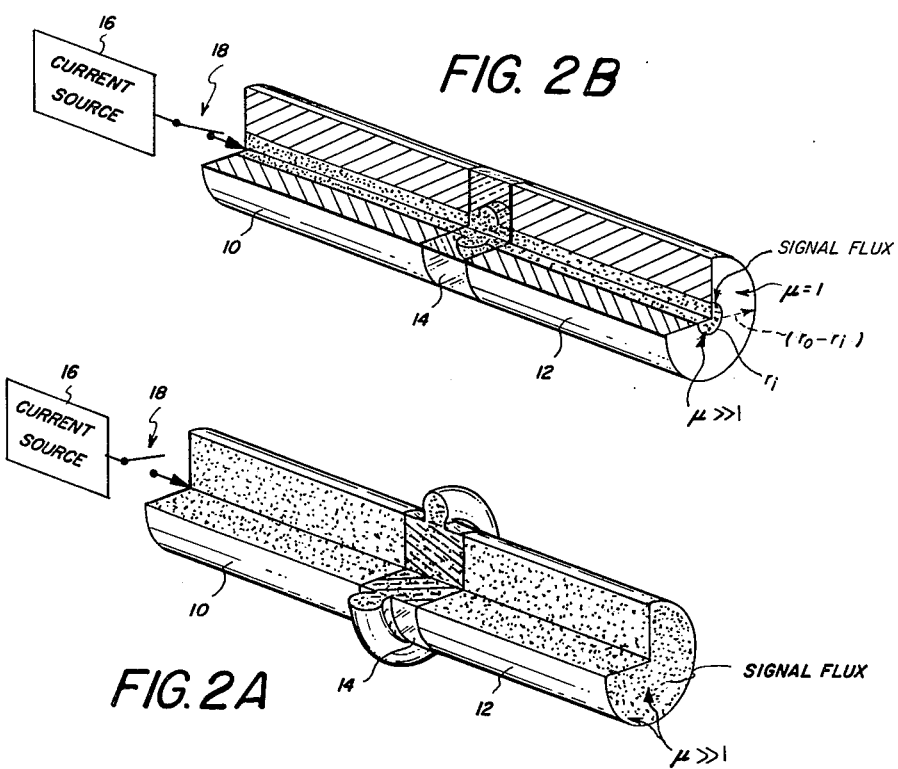
FIG. 2B
FIG. 2A

MAGNETIC HEAD HAVING A CONTROLLABLE HIGH-PERMEABILITY TUNNEL WITHIN A LOW-PERMEABILITY SLEEVE

BACKGROUND OF THE INVENTION (1) Field of the Invention

This invention relates in general to magnetic heads and in particular to magnetic head cores which may be switched into and out of operation.

The primary application of the invention is in connection with recording practices, as disclosed in copending U.S. patent application Ser. No. 029,095, wherein shallow-depth recording is effected by use of a transducer gap having a "magnetic" length of less than about 15 microinches; and wherein the recording medium is, preferably, such that it will support a vertical component of magnetization.

(2) Description Relative to the Prior Art

The traditional form for a magnetic head—say a single-track record head—is a gapped magnetic core on which a coil of wire is wound. Electrical signal current in the coil induces a magnetic field within the core and, as the flux lines of the field close on themselves, they bridge, and fringe out from, the gap. A magnetic medium in contact with the head at its gap is linked by the gap fringing field, thereby effecting recording in the medium. Although the traditional form of magnetic head has many uses, there are, however, some instances when it is desirable to provide ancillary control of the recording function, whereby despite the presence of signal current in the coil, recording may be effected, or not, at will.

A traditional reproduce head similarly is comprised of a gapped magnetic core on which a "reproduce" coil is wound, the dimensions of the "reproduce" gap being, however, often different from the dimensions of the "record" gap. Signal flux patterns in a magnetic medium in contact with such a reproduce head at its gap cause flux to enter the core, link the coil thereon, and exit the core at the gap, thereby inducing signal current in the reproduce coil. Just as there are instances when it is desirable to provide ancillary control of a recording function, there are also instances when it is desirable to provide ancillary control of a reproduce function, i.e., despite the fact that the reproduce gap is in contact with a recorded flux pattern, flux is controllably precluded from coursing the core and linking the reproduce coil.

With the above as background, consider for a moment a multitrack magnetic record head comprised of a stack of head cores with their respective gaps aligned along a gap line; and imagine, for example, a common signal-carrying coil linking all such cores. By successively turning on, and off, each core in the stack by means of a respective ancillary control, each core will take a time-division sample of the signal in the common coil—and if the line of core gaps is in contact with a recording medium (magnetic taep), a plurality of time-division samples will be recorded in respective tracks of the medium. Such a process has been the vision of those in the video recording field for some time, whereby the whole concept of linear video recording would become commercially practicable. By time-division sampling of, say, an NTSC video signal, each picture element of each line could be recorded in a respective track at a low relative head-to-tape speed, thereby obviating the need for the high relative head-to-tape speeds which are common to helical scan and quadruplex recorders. In a similar way, playback of such a multitrack recording could be effected by successively switching on, and off, the cores in the stack, thereby to induce, successively, corresponding element signals in the common coil which links the cores.

The recording and playback of video signals are but two representative uses for the whole idea of ancillary control of the record and reproduce functions; and, obviously, many other uses may be contemplated, as well.

SUMMARY OF THE INVENTION

A magnetic, suitably gapped core according to the invention is made from electrically conductive magnetic material. The gap spacer, which is less than about 15 microinches, is electrically conductive and of low permeability; and electrically non-conductive means forms part of the core to assure that electrical current, flowing in the core, passes through the gap. With current flowing in the core through the gap, a high permeability tunnel within a low permeability sleeve is created within the core—which, in the case of a recording head, works to prevent a fringe field from emanating from the core gap. With no current traversing the core gap, the low permeability sleeve is nonexistent, and attendantly any field within the core can spread out cross-sectionwise of the core; and, when bridging the core gap, such field fringes out from the gap to effect recording.

In the case of a reproduce head, on the other hand, the controllable existence, or not, of the low permeability sleeve works to create, or not, a large spacing loss, whereby the head will, or not, provide signal playback.

The invention will now be described in detail with reference to the figures, wherein:

FIG. 1 is a diagram useful in describing the concepts of the invention;

FIGS. 2A and 2B are perspective views showing how the existence, or not, of a low permeability sleeve works to permit recording (or playback), or not, to take place;

Figure 3:
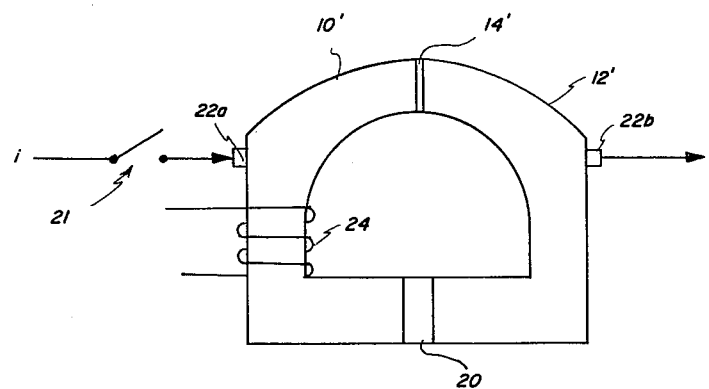
FIG. 3 is a side elevational view of a magnetic head according to the invention.

As background for a description of apparatus embodying the invention, reference should now be had to FIG. 1 which shows a somewhat generalized relationship depicting the current-induced field H within a magnetic electrical conductor of circular cross-section (radius R) as a function of the distance r from the center of the conductor. Such relationship, it will be appreciated, is akin to the well-known relationship, described in basic texts in Physics, between the current-induced field within a non-magnetic electrical conductor of circular cross-section and the distance r from the center of such conductor. (The extension to non-circular cross-sections is straightforward and similarly treated in such texts.)

In accordance with the invention, a current of suitable magnitude is passed through an electrically conductive magnetic structure, thereby to create a field within the structure which gets increasingly stronger from the center of the structure to the surface of the structure. The field $H_i$, depicted in FIG. 1, is that which is just sufficient to saturate the magnetic material of the structure; and the field $H_o$ is that which occurs at the surface of the structure. Thus, a magnetically saturated sleeve, having a thickness $(r_o-r_i)$ is formed in the current-carrying magnetic material. It will be further appreciated that, when the material magnetically saturates, its permeability goes to one, and attendantly the sleeve which is created is of low permeability; corrolarily, the unsaturated magnetic material within the sleeve is of high(er) permeability.

Still preparatory to a description of apparatus embodying the invention, reference should now be had to FIGS. 2A and 2B. In FIG. 2A, hypothetical first and second electrically conductive magnetic poles 10, 12 (of circular cross-section), separated by an electrically conductive, non-magnetic spacer 14, are depicted carrying what will be referred to as signal flux. As the signal flux bridges the poles via the spacer 14, it fringes outwardly from the poles and, as is known, it is such fringing which is the mechanism by which magnetic recording is effected. Although the poles and spacer of FIG. 2A are adapted to conduct current from a source 16, a switch 18 between the source and poles/spacer structure is open in FIG. 2A; and no current flows.

At the instant that the switch 18 is closed, as in FIG. 2B, current flowing from the pole 10 to the pole 12 via the spacer 14 creates a field which causes magnetic saturation of the poles from a radius of $r_i$ to a radius of $r_o$. Attendantly, the signal flux, in seeking a low reluctance path between the poles, gets confined to within the radius of $r_i$ of the poles and, therefore, does not fringe outwardly from the poles. This, it will be appreciated, is the mechanism of a record head according to the invention: when the current is on, the head has no fringe field and is therefore prevented from recording; with the current off, however, the head has a fringe field and recording may take place.

In the case of a reproduce head—still referring to FIGS. 2A and 2B—the known spacing loss (SL) relationship of $$SL = 55(d/\lambda) dB$$

where d is the distance between a recording medium and the poles, and $\lambda$ is the wavelength of a recorded signal, is employed to advantage: In the FIG. 2A case where no current courses the poles and spacer, the flux from, say, a magnetic tape in contact with the poles may easily enter the poles at the gap spacer, and induce signal current in a coil cooperating with the poles; in the case of FIG. 2B, however, a relatively large spacing loss corresponding to the distance $(r_o-r_i)$ is in evidence when a current is passed through the poles/spacer. Such spacing loss, which is especially operative for short recorded wavelengths, prevents significant flux from entering the poles and inducing signal current in a coil cooperating with the poles. Thus, with current flowing through the poles, the reproduce head is disabled; with current not flowing through the poles, the reproduce head is operative.

Referring now to FIG. 3, a single track magnetic head according to the invention is comprised of first and second pole parts 10', 12' formed of an electrically conductive magnetic material (e.g., permalloy), the pole parts being separated from each other by less than about 15 micro-inches by means of an electrically conductive non-magnetic gapping material 14' (e.g., gold). The space between the pole parts 10', 12', therefore, constitutes a transducer gap.

An electrically non-conductive spacer 20 completes the magnetic circuit for the pole parts; and, because the spacer 20 is electrically non-conductive, electrical current i, passing via a switch 21, when closed, through the head between electrical contacts 22a, 22b, is forced to traverse the transducer gap of the head. A coil of wire 24, inductively coupled to the head, either constitutes the signal source for the head (when the head acts as a record head) or inductively produces signal current in response to flux entering the head at its gap (when the head acts as a reproduce head).

It will be appreciated that current flow through the head via the contacts 22a, 22b creates a low permeability sleeve about a high permeability center, in the manner disclosed above in connection with FIG. 2B, thereby disabling the head, whether the head is operating in a record or reproduce mode. Absent such a current in the head, the low permeability sleeve is non-existent, a 1a FIG. 2A, and attendantly the head can record, or reproduce, signals, as the case may be. Ancillary control of the record or reproduce functions is, therefore, achieved by controlling current flow through the head core material.

Figure 4:
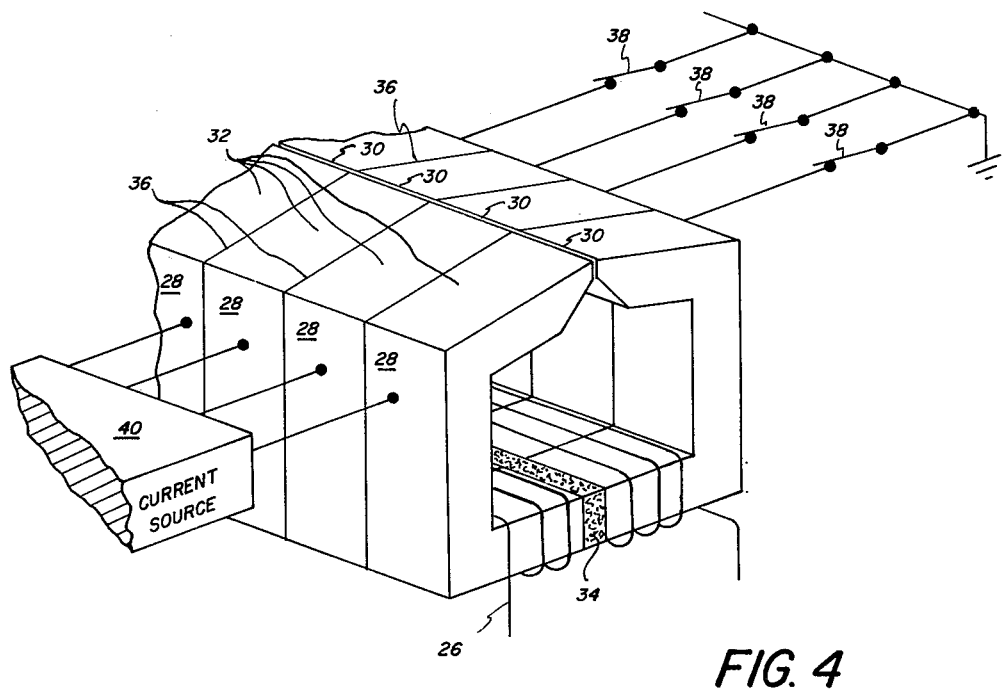
FIG. 4 is a perspective view of a multitrack head incorporating the invention.

It was indicated above that the concept of having a multitrack magnetic head having a common inductor, and (easily structured) ancillary means for selectively turning on each discrete core of the head, has long been desired by those skilled in the art. FIG. 4 shows a multitrack head which embodies the invention and satisfies such long-felt need: Referring therefore to FIG. 4, a coil 26, inductively linking each of a plurality of discrete cores 28, is adapted to carry signal current, e.g., current corresponding to an NTSC video signal. The cores 28, typically numbering as many as there are elements in a video line, have respective aligned non-magnetic electrically conductive spacers 30, and electrically conductive magnetic bodies 32. Electrically non-conductive means 34 is situated in the back portion of the head . . . and electrical insulation 36 exists between each of the cores to prevent current in one core from coursing through its adjacent core(s).

With an NTSC video signal applied across the coil 26, successive opening (and closing) of switches 38 causes each core 28 to produce a successive fringe field video element sample of the signal across the coil 26 as the low permeability sleeve in each core is extinguished and recreated by the interruption and startup of current from a source 40. Thus, a recording medium in contact with the head of FIG. 4 at its gap (30) line may be recorded on and in a plurality of tracks and, it will be appreciated, such recording, and playback, therefore, may be at a relative head-to-tape speed which is but a fraction of those previously employed.

During playback, successive element samples of the multitrack recording may be taken, as discussed above in connection with FIGS. 2A and 2B.

Figure 5:
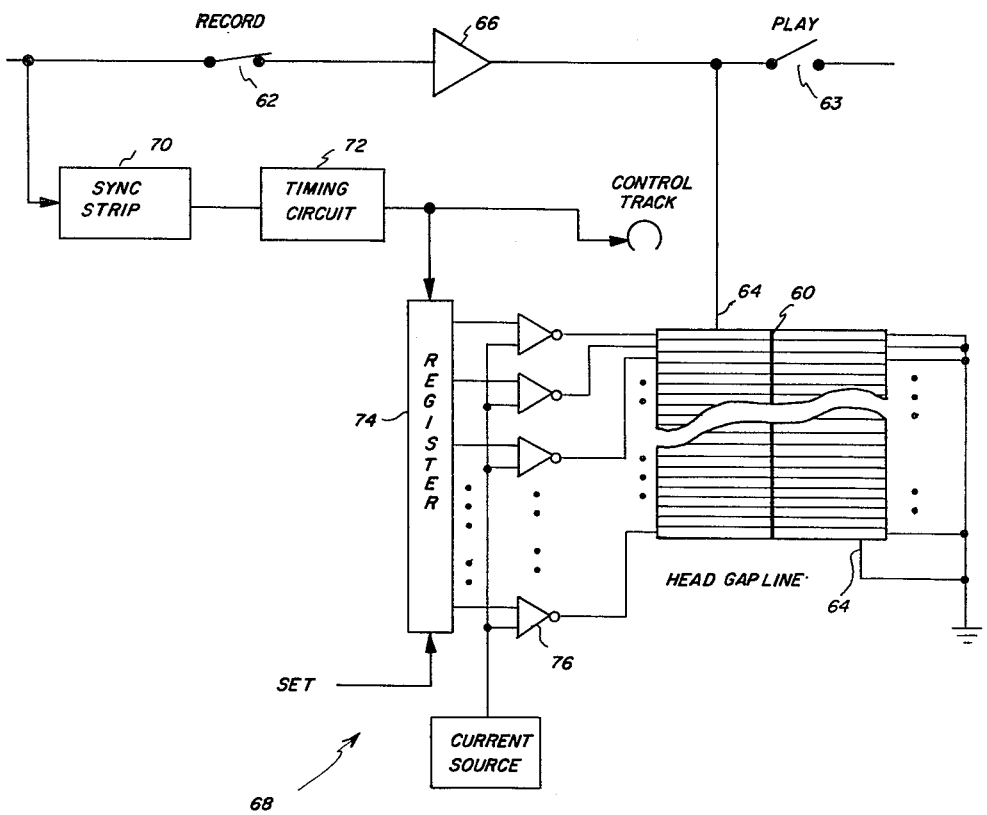
FIG. 5 is a schematic showing of a video recording and reproducing system employing a multitrack head according to the invention.

Consideration should now be had to the record/reproduce system appearing in FIG. 5: A multitrack magnetic head 60 of the form described above is employed for both record and reproduce purposes, depending upon which of two switches 62, 63 is closed. During recording, an NTSC video signal is applied to the common coil 64 of the multitrack head 60 via a record amplifier circuit 66; and such signal is sampled by means of a sampling circuit 68. The sampling circuit 68 operates by stripping sync (70) from the NTSC signal input (a well-known procedure) and, in response to the stripped sync, produces (72) a train of timing pulses for successively advancing the stages of a register 74. The timing pulses are also recorded in a control track for control of the register 74 during playback. The register 74, whether during recording in response to pulses from the circuit 72, or in response during playback to pulses from the control track, successively opens and closes a set of current-receiving NOT gates 76, thereby to turn on the cores of the multitrack head 60 to record, or play back, as the case may be.

The invention has been described in detail with particular reference to preferred embodiments thereof, but it will be understood that variations and modifications can be effected within the spirit and scope of the invention. For example, although the multitrack head of FIG. 4 is depicted as comprised of opposing banks of pole pairs, it is within the scope of the invention for one such bank to be formed of an integral electrically conductive magnetic structure.

What is claimed is:

1. Apparatus forming part of a magnetic signal-transducer, adapted for cooperation with a magnetic recording medium, comprising:
   (a) first and second pole parts formed of magnetic electrically conductive material;
   (b) electrically conductive spacer means, less than about 15 microinches in thickness, sandwiched between said pole parts and in electrical contact with said pole parts, thereby to form, with said pole parts, a transducer gap structure having an effective magnetic gap length of less than about 15 microinches adapted to contact said recording medium; and
   (c) means for selectively passing an electrical current from one pole part to the other via said spacer means, thereby to alter the magnetic properties of the pole parts in proximity to said medium.

2. Apparatus forming part of a magnetic head comprising:
   (a) first and second electrically conductive magnetic pole parts;
   (b) electrically conductive non-magnetic spacer means in contact with and between the pole parts for forming a transducer gap between said pole parts, said spacer means being such that the effective magnetic gap length that it creates between said pole parts is less than about 15 microinches in thickness;
   (c) means for preventing current flow between said pole parts, except through and via said spacer means; and
   (d) means for selectively passing a current from one pole part to the other via said spacer means, thereby to activate the head apparatus, depending upon whether current is passing between said pole parts.

3. The apparatus of claim 2 wherein said means for preventing current flow between said pole parts is an electrically non-conductive second spacer between and in contact with said pole parts.

4. The apparatus of claim 2 adapted for the recording and/or playback of signals, and including at least one coil inductively coupled to said pole parts, whereby when a signal to be recorded is applied to said coil, appreciable magnetic flux fringes from between said pole parts only when current from said ancillary means is not flowing between said pole parts, and whereby when flux recorded in a magnetic medium is to be productive of playback signal current in said coil, appreciable magnetic flux from said medium links the pole parts only when current from said ancillary means is not flowing between said pole parts.

5. The apparatus of claim 3 adapted for the recording and/or playback of signals, and including at least one coil inductively coupled to said pole parts, whereby when a signal to be recorded is applied to said coil, appreciable magnetic flux fringes from between said pole parts only when current from said ancillary means is not flowing between said pole parts, and whereby when flux recorded in a magnetic medium is to be productive of playback signal current in said coil, appreciable magnetic flux from said medium links the pole parts only when current from said ancillary means is not flowing between said pole parts.

6. Apparatus forming part of a multitrack magnetic head comprising:
   (a) a plurality of gapped magnetic cores formed of electrically conductive material, the gaps providing respective facing pole pieces;
   (b) respective electrically conductive non-magnetic material filling the gaps of said cores, said gaps being such that the effective magnetic gaps length is less than about 15 microinches;
   (c) means forming part of the respective cores for preventing electrical current flow, except through the gaps of said cores;
   (d) means electrically insulating said cores from each other; and
   (e) ancillary means for selectively passing electrical current through the respective pole pieces and gaps of said cores, thereby to control the operation, respectively, of said cores.

7. The apparatus of claim 6 wherein said means for preventing electrical current flow except through the gaps of said cores is electrically non-conductive spacer means which forms respective parts of said cores.

8. The apparatus of claim 6 further including a coil inductively coupled to all of said plurality of cores thereby forming a completed multitrack magnetic head, whereby selective passage of current through said core pole pieces and gaps by said ancillary means effects time-division sampling of any signal in said coil when said head is employed for recording purposes, and time-division sampling of a multitrack recording when said head is employed for playback purposes.

9. The apparatus of claim 7 further including a coil inductively coupled to all of said plurality of cores thereby forming a completed multitrack magnetic head, whereby selective passage of current through said core pole pieces and gaps by said ancillary means effects time-division sampling of any signal in said coil when said head is employed for recording purposes, and time-division sampling of a multitrack recording when said head is employed for playback purposes.

10. Apparatus for magnetically recording a signal corresponding to video elements of a video line, said apparatus comprising:
   (a) a multitrack magnetic head having as many gapped magnetic cores as there are video elements in said video line, and a coil inductively coupled to all said cores, said cores being electrically conductive including electrically conductive gap spacers, and provided with means for assuring that electrical currents therein pass exclusively through their respective gaps and the respective core pole pieces that define said gaps, said gaps being such that the effective magnetic gap length is less than about 15 microinches;

(b) means for applying said signal, corresponding to the video elements of said video line, to said coil; and (c) means for selectively applying electrical currents to said cores to deactivate said cores, said currents flowing through respective pole pieces and gaps of said cores, and for sequentially interrupting said currents at the video element signal rate, thereby to activate, respectively, said cores to produce sequentially in said cores flux samples corresponding to said signal in said coil.

11. Apparatus for reproducing video element signal samples corresponding to a video line, said signal samples being magnetically recorded in a magnetic medium in a number of tracks corresponding to the number of video elements in said video line, said apparatus comprising:

(a) a multitrack magnetic head having a plurality of gapped magnetic cores, each of which has an effective magnetic gap length less than about 15 microinches and is adapted to cooperate with a respective track of said medium, said cores being electrically conductive, including electrically conductive gap spacers, and provided with means for assuring that electrical currents therein flow exclusively through their respective gaps, said head further having a coil inductively coupled to all said cores; and (b) means for selectively applying electrical currents to said cores to deactivate said cores, said currents flowing through respective pole pieces and gaps of said cores, and for sequentially interrupting said currents at the video element signal rate, thereby to induce sequentially in said coil signals corresponding to the video element signal samples recorded in said magnetic medium.

* * * * *